Patented May 11, 1926.

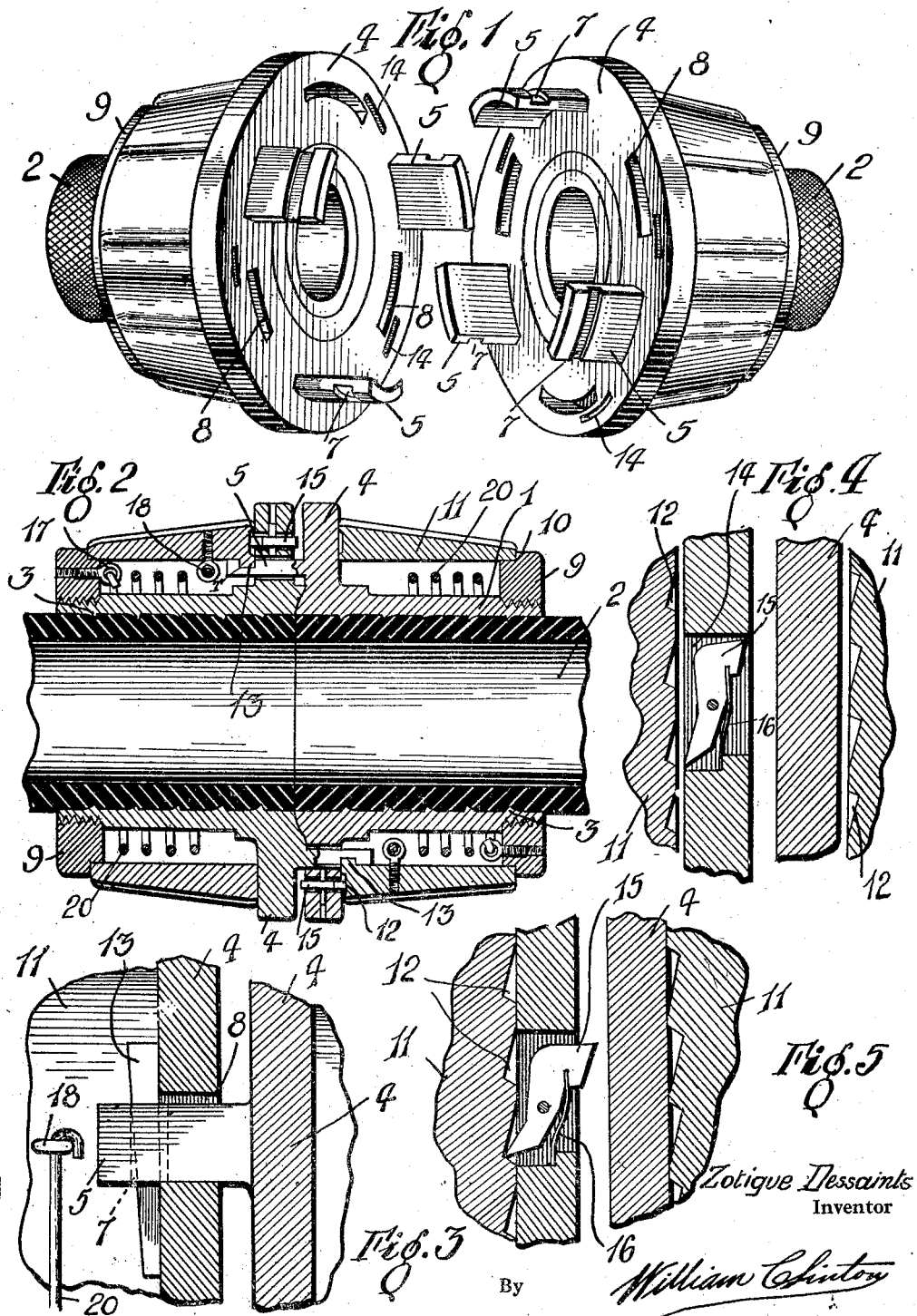

1,584,278

UNITED STATES PATENT OFFICE.

ZOTIQUE DESSAINTS, OF RIVIERE DU LOUP EN BAS, QUEBEC, CANADA.

FIRE-HOSE COUPLING.

Application filed September 24, 1925. Serial No. 58,400.

The present invention pertains to a novel coupling designed particularly for use in connection with fire hose but also useful wherever a rapid and effective coupling is required.

The principal object of the invention is the provision of a simple construction of this character adapted to form an effective and fluid tight joint which is automatically locked against accidental release or uncoupling. In the accomplishment of this object, there are provided two similar coupling members carried by the ends of the hose or tube to be joined. Each such member includes a body or sleeve fixed to the tube end and carrying a shoulder from which project a series of grooved tongues adapted for reception in appropriate slots formed in the shoulder of the complementary member. Each such body is surrounded by a relatively rotatable collar carrying keys which lock in the grooved tongues of the complementary member. The collar is preferably joined to the body by means of a spring so that a tension may be made between these two parts prior to assembling the joint. Upon release of the collars after fitting the tongues into their respective slots, the collars slightly turn and wedge the keys into the grooves of the tongues.

A futher feature of the invention is the provision of a locking device between each collar and its corresponding shoulder for the purpose of preventing relative shifting between these parts which might occur as a result of vibrations and thus open the coupling.

The invention is fully disclosed in the following description and in the accompanying drawings in which:

Figure 1 is a perspective view of the coupling members;

Figure 2 is a longitudinal section of a coupling formed by the members comprising the subject matter of the invention;

Figure 3 is a fragmentary circumferential section of one of the members;

Figure 4 is another circumferential section taken in a different plane and showing one of the pawls in released position; and Figure 5 is a similar section of Figure 4 showing the pawl in locking position.

Reference to these views will now be made by use of like characters which are employed to designate corresponding parts throughout.

The invention comprises a pair of complementary members each being the counterpart of the other, and adapted for application to the end of the hose or tube to be joined. Since the two members are identical in construction only one of them need be described.

The member consists of a cylindrical sleeve or body 1 fixedly secured around the end of the hose or tube 2 to be joined to a similar end. The body is held firmly on the end by means of ribs 3 projecting from the body into the tubular member.

At the joining end of the member is formed an integral circular shoulder 4 from which project a plurality of curved tongues 5. Each tongue has a groove 7 in its back, the purpose of which is pointed out below.

Between the tongues are formed slots 8 adapted to receive the tongues of the counterpart member.

On the outer or remaining end of the body 1 is threaded a screw ring 9 which is rabbetted at its outer circumference as indicated by the numeral 10 in Figure 2. The body or sleeve 1 is surrounded by a rotatable collar 11 one end of which is received in the groove 10 while the other end rides over the back of the shoulder 4 and is formed with notches 12 shown in Figures 4 and 5.

A plurality of tapered keys 13 project inwardly from the collar 11 in such a manner as to be received in the grooves 7 of the tongues 5 projecting from the complementary member. The shoulder 4 is also formed with recesses 14 in each of which is pivoted a pawl 15 normally pressed into engagement with the adjacent notched face 12 by means of a spring leaf 16. The ring 9 and collar 11 carry screw eyes 17 and 18 respectively to which are attached the ends of a coil spring 20 wound around the body 1.

In assembling the joint, assuming that the two members are separated, the collars 11 are first turned slightly against tension of the springs 20. The grooved tongues 5 are now slipped into the complementary slots 8, and the collars 11 are released. The springs 20 turn the collars to their normal position and at the same time wedge the keys 13 into the grooves 7 thereby locking the two members together. Also, the pawls 15 lock against the notched faces 12 and thus prevent any accidental shifting of the collars which might release the keys from the slots 7 of the tongues 5. In separating the joint, a tool is driven into the space between the shoulders 4 in order simultaneously to turn the pawls 15 and thus release them from the notches 12. The collars 11 are now free to be turned until the keys 13 are released from the slots 7.

While a specific embodiment of the invention has been illustrated and described, it is to be understood that various alterations in the details of construction may be made without departing from the spirit of the invention as indicated by the appended claims.

Having thus fully described the invention, what I claim as new and desire to protect by Letters Patent is:

1. A coupling consisting of a pair of complementary members, each member comprising a sleeve adapted to be fitted over the end of a tube, a shoulder at the joining end of said sleeve, grooved tongues projecting from said shoulder, slots formed in said shoulder intermediate said tongues, a collar rotatable around said sleeve, said collar having a notched face, keys projecting from said collar and adapted for reception in the grooved tongues of the complementary member, and pawls pivoted in said shoulder and adapted to lock against the notched face.

2. A coupling consisting of a pair of complementary members, each member comprising a sleeve adapted to be fitted over the end of a tube, a shoulder at the joining end of said sleeve, grooved tongues projecting from said shoulder, slots formed in said shoulder intermediate said tongues, a collar rotatable around said sleeve, said collar having a notched face, keys projecting from said collar and adapted for reception in the grooved tongues of the complementary member, a spring connection between the sleeve and the collar, and pawls pivoted in said shoulder and adapted to lock against the notched face.

In witness whereof I have hereunto set my hand.

ZOTIQUE DESSAINTS.